Aug. 4, 1936.  E. A. STALKER  2,049,573
CONTROL OF AIRCRAFT
Filed March 14, 1936  3 Sheets-Sheet 1
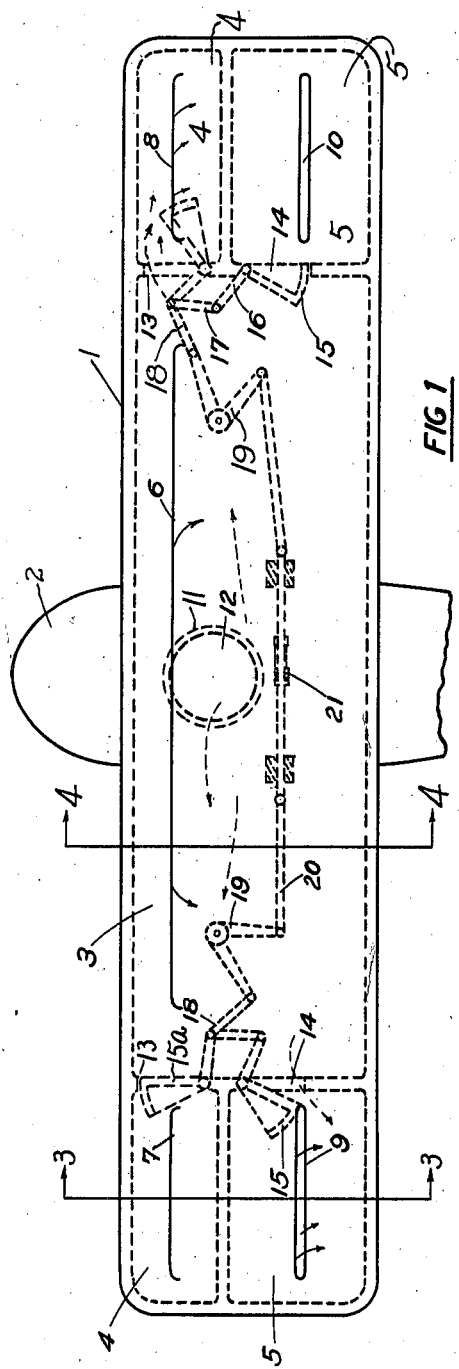
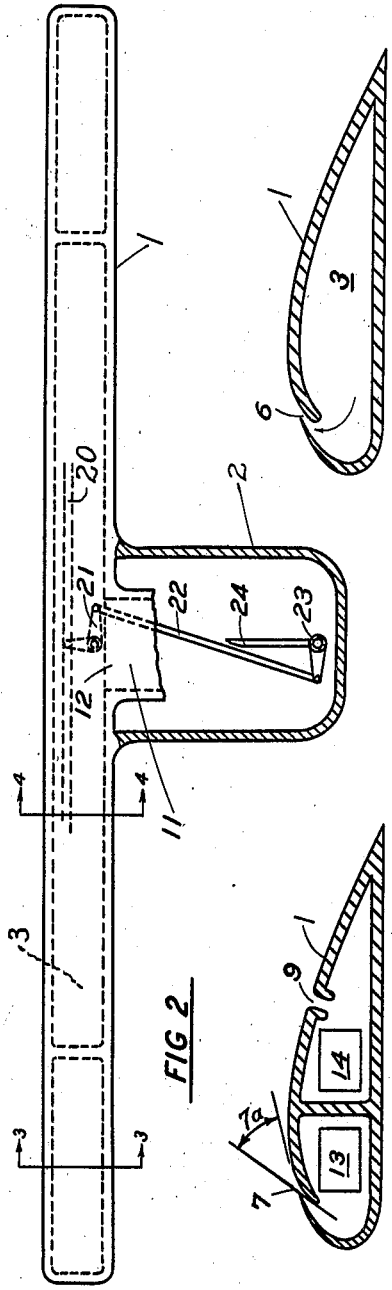
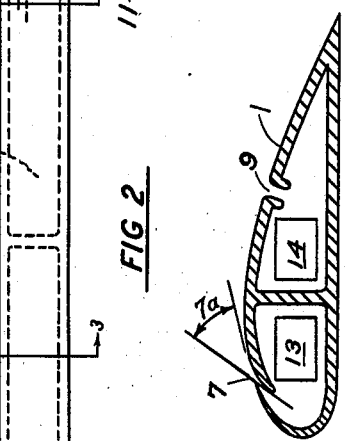
INVENTOR
Edward A. Stalker

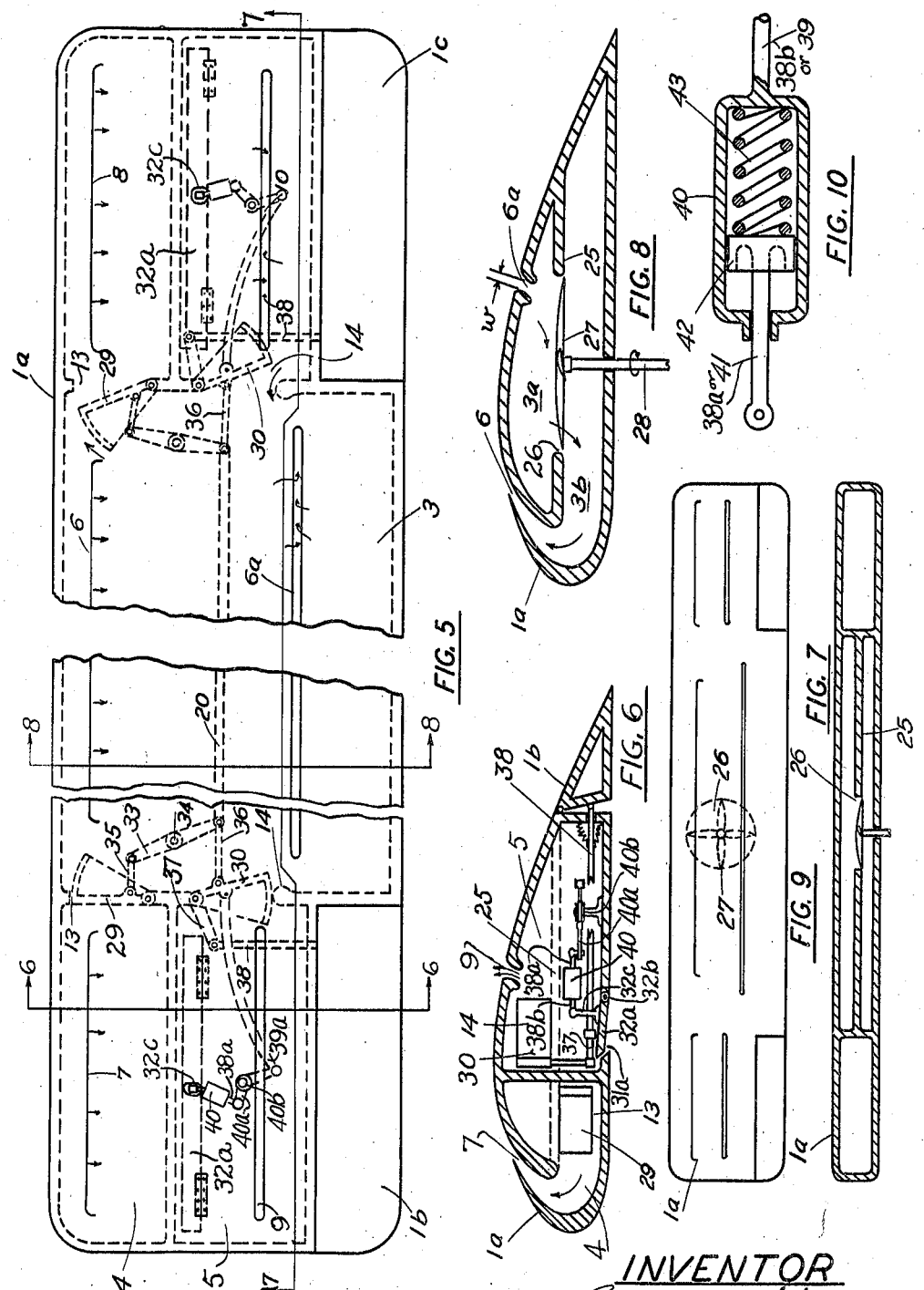

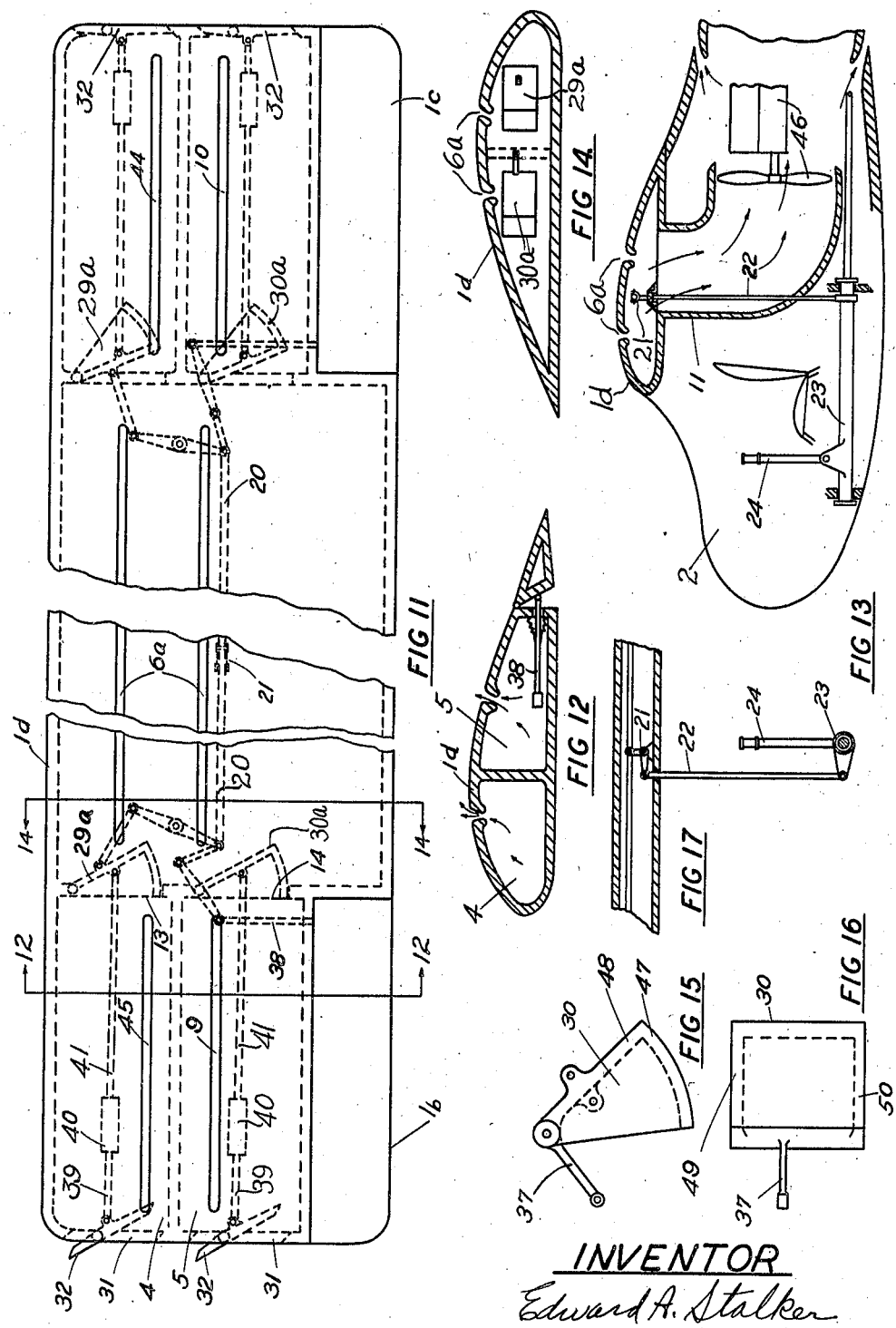

Patented Aug. 4, 1936

2,049,573

UNITED STATES PATENT OFFICE 2,049,573

CONTROL OF AIRCRAFT

Edward A. Stalker, Ann Arbor, Mich.

Application March 14, 1936, Serial No. 68,803

7 Claims. (Cl. 244—12)

My invention relates to the control of aircraft through aerodynamic means. It contains subject matter in common with my application Serial No. 757,149, filed December 12, 1934.

The objects of my invention are first, to provide means of creating rolling moments through control of the boundary layer; second to provide means of creating adequate rolling moments accompanied by proper yawing moments; third to provide means of obtaining proper rolling moments at angles of attack of the wings beyond the normal range. Other objects will appear from the accompanying description and drawings.

I accomplish the above objects by the devices illustrated in the accompanying drawings in which—

Figure 1 is a fragmentary top plan view of the aircraft;

Figure 2 is a fragmentary front elevation partly in section;

Figure 3 is a section along the line 3—3 in Figure 1;

Figure 4 is section along line 4—4 in Figure 1;

Figure 5 is a fragmentary plan view of an alternate but preferred wing;

Figure 6 is a section along line 6—6 in Figure 5;

Figure 7 is a fragmentary section of the wing, taken along line 7—7 in Figure 5;

Figure 8 is a section taken at the center of the wing along line 8—8 in Figure 5;

Figure 9 is a fragmentary top plan view of the wing showing the location of the blower along the span;

Figure 10 is an axial section of the control cylinder;

Figure 11 is a fragmentary top plan view of still another wing;

Figure 12 is a vertical section along the line 12—12 in Figure 11;

Figure 13 is a fragmentary part section of the aircraft;

Figure 14 is a vertical section along line 14—14 in Figure 11;

Figure 15 is a top plan view of a control gate;

Figure 16 is a vertical elevation of a gate;

Figure 17 is a fragmentary vertical section of the aircraft to show the relation of the control stick to the control mechanism in the wing.

Similar numerals refer to similar parts throughout the several views.

When an aircraft is banked by the use of an aileron or other device the yawing moment should be either neutral or slightly in the direction of the turn. That is, the rising wing should also have a tendency to advance more rapidly than the declining wing. Ordinary ailerons give the reverse action.

When the aileron is depressed on one side of the airplane the lift increases and along with it the induced drag which is a function only of the lift and the span. The aileron on the opposite side is raised and the lift is decreased with a resultant decrease of induced drag. These drag changes are obviously of the wrong sign and cause an adverse yawing moment. It is one object of this invention to remedy this defect.

Ailerons, as is well known, become ineffective near the angle of maximum lift of the wing. There is a very definite ultimate maximum lift for conventional wings due to a change in angle of attack or camber. An ordinary aileron gives a rolling moment by changing both the angle of attack and camber of the outer portion of the wing. If the wing is already flying at maximum lift angle a further increase in angle of attack by a depression of the aileron will not lead to a further increase in lift.

It is known that the ultimate value of the maximum lift for a conventional wing can be increased by an energization of the boundary layer on the wing surface.

Briefly, energization of the boundary layer consists in adding energy to it by blowing out a slot or by drawing the boundary layer into the wing interior. Both methods in effect suppress it. When blowing is used the jet should be directed rearward along the wing surface preferably tangentially thereto. The jet must not be discharged normal to the surface because it will not then impart any velocity to the fluid in the direction of flow along the surface. Such normal discharge will merely induce turbulence in the flow in opposition to the purpose of boundary energization to reduce it.

Any air discharged from a slot into the boundary layer must have at least as much energy or velocity as the boundary layer, more if energization is to take place. Air of lower energy or velocity when mixed with the boundary layer will serve only to de-energize the boundary layer since after mixing, the energy or velocity per unit volume will be less.

This application differs from that of Serial No. 757,149 in providing a surface slot in the wing tip surface instead of a through slot and in providing both suction and blowing means for surface slots in the central portion of the wing.

Referring to the Figures 1 to 4 particularly, the aircraft body is 2 and the wing is 1. The wing is hollow and formed into compartments 3, 4 and 5. The central compartment is 3 and the tip compartments are 4 and 5, a set at each tip.

Each compartment has a slot leading into it through the upper surface of the wing. The slot 6 in the central portion of the wing leading into the compartment 3 is a rearward directed discharge slot to discharge fluid along the wing surface toward the trailing edge of the wing. The slots 7 and 8 leading into the tip compartments 4 are also discharge slots formed similarly to slot 6. Slots 9 and 10 are induction slots primarily and are in communication with the compartments 5 as indicated in the figures.

A duct 11 leads into the wing compartment 3 and has the exit 12. A suitable blower (not shown) in the fuselage is to be used to force fluid such as air into the compartment 3. This fluid will issue from slot 6 and energize the boundary layer so that very large lifting capacity, can be realized from the wing.

To control the lateral or rolling movement of the aircraft a flow to the compartments 4 and 5 is provided for by the ports 13 and 14 at each wing tip.

In normal straight flight the ports 14 are closed by the gates 15 so that there is no flow through the slots 9 and 10 but a discharge through slots 6, 7 and 8. That is, when both gates 15a are symmetrically disposed with respect to the longitudinal axis of the aircraft, they do not completely close the ports 13.

In executing a roll the gates are positioned as shown in Figure 1. The wing tip having slot 8 is to rise and the tip with slot 7 is to fall. The gate positions permit an outflow through slot 8 to increase the lift and a flow through slot 9 to decrease the lift. Slots 7 and 10 are closed to communication with compartment 3 to exclude any flow, which is desirable for the tip movements indicated. If the opposite roll is desired the position of the gates on opposite sides of the aircraft is reversed.

The movements of the gates are controlled through the levers 16, links 17 and 18, bell cranks 19, and rod 20 which in turn is moved by the bell crank 21, rod 22 and torque tube 23 rotated by the control stick 24.

I illustrate the preferred form of the wing in Figures 5 to 10. The wing is 1a and has within similar tip compartments to wing 1. The central portion of the wing is divided into two compartments 3a and 3b. Each of these compartments has a slot in the upper surface. The front slot 6 is a discharge slot while slot 6a is an induction slot.

As shown particularly in Figures 6, 7 and 8, compartment 3a is separated from compartment 3b by the horizontal wall 25. A central opening 26 accommodates a blower 27 rotatable with shaft 28. A suitable means of driving the blower has been described in my Patent Number 1,913,644 issued June 13, 1933. The rotation of the blower induces a flow inward through the slot 6a and out the slot 6.

It is to be noted that port 13 is below port 14 so that they communicate with the compartments 3a and 3b, respectively. See figure 6 particularly.

Lateral control is obtained by controlling the flows out the slots 7 to 10. As shown in Figure 5 the gates 29 and 30 are set for a rise of the wing tip having slots 8 and 10. That is, the right-hand gates are open so that a flow is induced through slots 10 and 8, the former having an inflow; and the left-hand gates are closed so that there is no communication between slots 7 and 9 and the compartments 3a and 3b.

In the under surface of the wing there are additional ports 31a leading into the compartments 5. These ports are normally closed by a valve 32a, as shown on the right of Figure 5. When executing a roll, one of the ports is partly open as, for instance, on the left in Figure 5. The valve 32a is rotated in coordinated relation with the gates 29 and 30 and serves to increase the drag of the left wing tip and decrease its lift. The flow of air out the slot 9 from port 31a increases the drag of the wing tip. The result is a very powerful lateral control with the adverse yawing moment suppressed to any desired degree. The control is particularly powerful because both suction and blowing are applied to one wing tip simultaneously with the elimination of the flow from slot 7 and the destruction of the lift by a flow from slot 9.

The mechanism to operate the gates and ailerons 1b and 1c is illustrated in the figures. A rod 20 interconnects the levers 33 rotatably mounted on suitable bearings at 34. Links 35 and 36 connect the gates to the lever 33. It will now be clear that a lateral movement of the rod 20 will open and close the ports 13 and 14. The gate 30 has fixed to it the lever arm 37 to which is attached universally the aileron rod 38. They attach to the ailerons 1b and 1c. Thus when the gates rotate the ailerons are also rotated. If the operation of the mechanism is traced it will be found that an upward movement of the trailing edge of the aileron 1b coincides with an outward flow through the slot 9 so that both devices decrease the lift of the wing. A similar description applies to aileron 1c. A downward movement of the ailerons coincides with lift increasing flows through the tip slots.

The valve 32a is controlled by the rod 39a pin connected at one end to gate 30 and at the other to the bell crank 40a which is pivoted at 40b. Links 38a and 38b extend forward to the valve arm 32c fixed to the valve 32a which is hinged at 32b. It will be apparent then that when the gate 30 is in the fully closed position the port or slot 31a in the lower surface of the wing is open.

A cylinder 40 is interposed between the links 38a and 38b to introduce a lag in the operation of the valve 32a with respect to gate 30. A cross section of the cylinder is shown in Figure 10.

The link 38a having the piston 42 at one end connects to the crank 40a. The piston is free to move in one direction but is yieldingly restrained against the opposite movement by the spring 43. When the rod 38a is pushed forward the valve 32a is closed and since rod 38a is made somewhat over-length the spring 43 is slightly compressed after the valve 32a has made contact with the beveled edge of the wing port 31a. When 38a is moved rearward there is some movement of the gates before 32a is rotated. This lag in operation permits the gates 30 to be open on each side of the longitudinal axis of the wing while valves 32a are closed. Thus boundary layer energization is accomplished on the outer portions of the wing during horizontal flight.

A third form of the wing is illustrated in Figures 11 to 14. Suction only is used to energize the boundary layer. The wing is 1d and the slots are 9, 10, 44, and 45. The slots 6a lead into the central compartment 3 while the slots 45 and 9 (or 44 and 10) communicate with the compartments 4 and 5. The slots such as 45 and 9 are separated from each other so that there is no flow within the wing from the rear compartment to the front, as would be the case because the suction at the front of a wing is greater than at the rear.

Air is withdrawn from the wing through the duct 11, Figure 13, by the blower 46.

For lateral control the gates 29a and 30a are operated differentially with the valves 32. That is, the ports 13 and 14 are closed as the ports 31 are opened. Thus at one wing tip an inward flow through slots 44 and 10 is induced by the fan 46 while at the other tip a flow out the slots 45 and 9 is created to destroy the lift. Proper rolling and yawing moments are thus provided.

The valves 32 are controlled by the valve rods 39 which have the cylinders 40 at their ends. The action is similar to that described in connection with Figure 5. Thus when 41 is moved inward there is some movement of the gates before the valve 32 is rotated. This lag in operation is desirable to insure that air does not enter the compartments 5 before the ports 14 are closed.

The mechanism to operate the gates and valves is similar to that shown in Figure 5. Figure 13 shows a side view of the control stick 24, torque tube 23 and rod 22. This type of pilot's control is a conventional and well known type.

A typical gate is shown in Figures 15 and 16. The gate has two vertical walls 47 and 48 and is open on the third vertical side. There are also top and bottom walls 49 and 50, respectively.

I prefer the use of a conventional wing section, that is, one having an increasing radius of curvature from the nose to the trailing edge. I also prefer that the slots for boundary control have a width of from one-half to two per cent of the chord length although much wider slots can be used.

Slots for blowing rearward should have walls overlapping rearward so that the discharge fluid is directed along the wing surface. A line drawn through the slot touching opposite sides, as in Figure 3, should make an angle 7a with the tangent to the surface at the slot less than 45 degrees. Induction or suction slots are preferably directed normal to the wing surface and have walls overlapping for a length at least equal to the slot width. Rearward directed slots can, however, be used for induction slots. In Figure 3 a typical blowing slot is 7 while an induction slot is 9. To effectively influence the boundary layer the slot width w (see Figure 8) should be less than 6 per cent of the chord length and preferably between ½ and 2 per cent. The slot should be elongated spanwise along the wing area to be influenced.

Since blowing out lower surface slots will influence the drag and lift of a wing, I wish it understood that I do not limit my invention to upper surface slots only.

While I have illustrated a preferred embodiment of my invention, I wish it understood that I do not intend to limit myself to these exact forms but intend to claim my invention broadly as set forth in the appended claims.

I claim:

1. In an aircraft, a wing associated with a relative wind and having a substantially fixed relation to the aircraft in a horizontal plane so that the wing can exert a yawing moment on the aircraft, said wing having a compartment and slot on each side of the longitudinal axis of the aircraft, said slots being in the upper surface of the wing and leading out of the compartment interiors, each of said compartments also having an inlet opening subject to the relative wind, blower means arranged for communication with said compartments to induce flows through said slots, and controllable means to place the compartment interior on either side of said axis alternately in communication with the relative wind through its respective said inlet and with the said blower means to produce rolling and yawing moments on the aircraft by flows through the slots.

2. In an aircraft, a wing having a compartment within and an associated slot on each side of the longitudinal axis of the aircraft, each of said slots leading out of its respective compartment and extending spanwise in the upper surface for use in energizing the boundary layer, a blower means normally in communication with both said compartments to induce a flow into said compartments to energize the flow over the wing, a roll inducing device operable at each side of the said axis, and controllable means to operate said roll inducing device at one side of said axis to lower the wing on said side and to direct a flow from said blower means out the surface slot on the same side in coordinated relation while the inflow through the slot on the opposite side is maintained.

3. In an aircraft, a hollow wing having a blowing control compartment and a suction control compartment at each tip and each compartment having a slot in the upper surface in communication with the compartment interior, said wing being mounted in said aircraft to transmit a yawing torque thereto, a means of blowing arranged for communication with said compartments through their inner ends, and means to control communication to said slots by said means of blowing to provide at one wing tip an outflow for a blowing slot and an inflow for a suction slot as well as to provide at the opposite wing tip an outflow for the suction slot, said means to control providing a rolling moment in conjunction with a suitable yawing moment.

4. In an airplane, a wing having at all localities thereon the same direction of motion through the air as the aircraft and having at each wing tip a compartment within and upper surface slots in communication with the interiors of said compartments, said surface slots being formed with their discharge axes directed more nearly along a perpendicular to the surface at the slot than transverse thereto so that an outward flow tends to destroy the lift, a means of blowing in communication with the inner ends of the compartments to cause a flow from said compartments out through said slots, and control means operable to direct a discharge of air from a preselected slot to provide rolling and yawing moments on the aircraft, said slots having widths which are minor fractions of the slot length so as to be suitable for controlling the boundary layer on the wing.

5. In an aircraft, a wing adapted to exert rolling and yawing moments on the aircraft, said wing having on each side of the longitudinal axis of the aircraft a compartment within and a blowing slot in the upper surface of the wing on each side of said axis in communication with a compartment interior, each said slot being elongated spanwise and leading out of its respective compartment and having overlapping sides to direct jets rearward along the surface, each said slot being formed so that a straight line through the slot touching opposite walls of the slot makes an angle less than 30 degrees with the tangent to the wing section contour at the slot, a second slot on each side of the said axis in the upper surface leading out of the wing, the said second slots being formed to discharge chiefly upward away from the wing surface for use in destroying the lift by a jet discharge, means of blowing in communication with said compartments and slots to induce jets out said slots and controllable means to govern simultaneously the flow differentially between blowing slots at opposite wing tips and between said second slots at opposite tips to exert rolling and yawing moments on the aircraft.

6. In an aircraft, in combination a wing having a blowing control compartment and a suction control compartment near each wing tip, also a main blowing compartment and a main suction compartment, said wing having in its upper surface suction slots in communication with the said suction compartments and blowing slots in communication with said blowing compartments, blower means to change the pressures in said main compartments to cause flows through their slots to energize the boundary layer on the wing, and controllable means to effect at one wing tip communication between the main blowing compartment and the control blowing compartment and between the main suction and the control suction compartment while suppressing communication between the main and control compartments at the opposite tip of the wing, and means to provide a flow out said suction slot at said opposite tip, said combination providing favorably related rolling and yawing moments on the aircraft.

7. In an aircraft, in combination, a wing having a main blowing compartment and a main suction compartment, also a blowing control compartment and a suction control compartment on each side of the longitudinal axis of the aircraft, a suction slot and a blowing slot in communication with the main suction and main blowing compartments respectively, said wing also having on each side of said axis suction and blowing slots in the surface respectively in communication with said suction control and blowing control compartments, a means of blowing in communication with said main suction and main blowing compartments to induce an inflow at the suction slot and an outflow at the discharge slot, controllable means of communication between the said control compartments and the said main compartments, and a steering mechanism to operate said controllable means to place at one wing tip the suction and blowing control compartments in communication respectively with the said main suction and main blowing compartments and to place at the other tip the suction control compartment in communication with a source of air under pressure for blowing out said suction slot.

EDWARD A. STALKER.